United States Patent [19]
Quine

[11] Patent Number: 5,935,195
[45] Date of Patent: Aug. 10, 1999

[54] AUTONOMOUS STAR IDENTIFICATION

[75] Inventor: Brendan Mark Edward Quine, Bristol, United Kingdom

[73] Assignee: Matra Marconi Space UK, Stanmore, United Kingdom

[21] Appl. No.: 08/825,190

[22] Filed: Mar. 27, 1997

[51] Int. Cl.[6] .................................................. B64G 1/36
[52] U.S. Cl. ................................. 701/222; 356/139.01
[58] Field of Search .................................. 364/524, 550; 701/13, 222, 226; 345/435, 9, 13, 423; 707/7; 250/203.1, 203.3, 203.6; 356/139.01; 434/111, 284, 289

[56] References Cited

U.S. PATENT DOCUMENTS

| | | | |
|---|---|---|---|
| 4,086,628 | 4/1978 | Woodrum | 707/7 |
| 4,617,634 | 10/1986 | Izumida et al. | 701/222 |
| 4,621,329 | 11/1986 | Jacob | 701/222 |
| 4,680,718 | 7/1987 | Sasaki et al. . | |
| 4,944,587 | 7/1990 | Harigae | 701/222 X |
| 5,204,818 | 4/1993 | Landecker et al. | 701/226 |
| 5,412,574 | 5/1995 | Bender et al. | 701/222 |
| 5,508,932 | 4/1996 | Achkar et al. | 701/226 |
| 5,727,204 | 3/1998 | Greene, VII | 395/613 |
| 5,745,869 | 4/1998 | van Bezooijen | 701/222 |

FOREIGN PATENT DOCUMENTS

WO 95/03214  2/1995  WIPO .

OTHER PUBLICATIONS

"A Fast Autonomous Star Acquisition Algorithm for Spacecraft"; Quine, et al; 1995 IFAC Autonomous Control Conference, Beijing, PRC, 9 pages.

"A Fast Autonomous Star Acquisition Algorithm for Spacecraft"; Quine, et al; Control Eng. Practice, vol. 4, No. 12, pp. 1735–1740, 1996.

True–sky Demonstration of an autonomous Star Tracker; Roelof W.H. van Bezooijen; Presented at the SPIE's International Symposium on Optical Engineering in Aerospace Sensing in Orlando, FL; Apr. 5, 1994, 13 pages.

"Rapid Star Pattern Identification"; Quine, et al.; Orlando, FL; Apr. 11, 1996, 9 pages.

*Primary Examiner*—Melanie A. Kemper
*Attorney, Agent, or Firm*—Venable; Robert J. Frank; Michael A. Sartori

[57] ABSTRACT

A method and apparatus compare a star to be identified within an image with data in a database generated from known star data. According to a first aspect of the invention, a target star to be identified within an image is selected, and a number of adjacent stars, normally two, are also selected. The separation values between the stars and a geometric identity for each separation value are determined. This data is compared with corresponding data stored in a database for known stars, where the data in the database is generated using the same technique. According to a second aspect of the invention, a target star is selected, and adjacent stars are selected from an annulus centered on the target star. The separation values for the stars are determined and compared with known separation values stored in a database, where the data in the database is generated using the same annulus centered on each known target star.

28 Claims, 3 Drawing Sheets

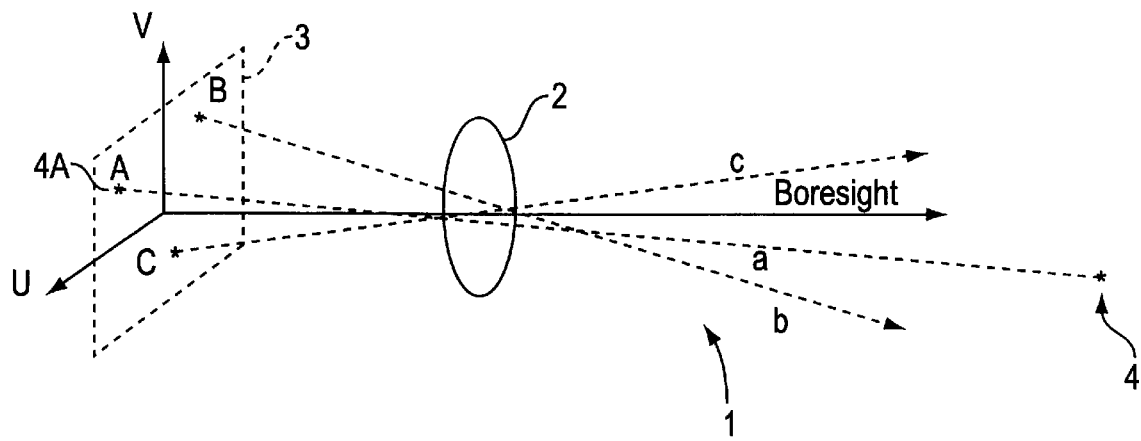
FIG. 1
FIG. 2A
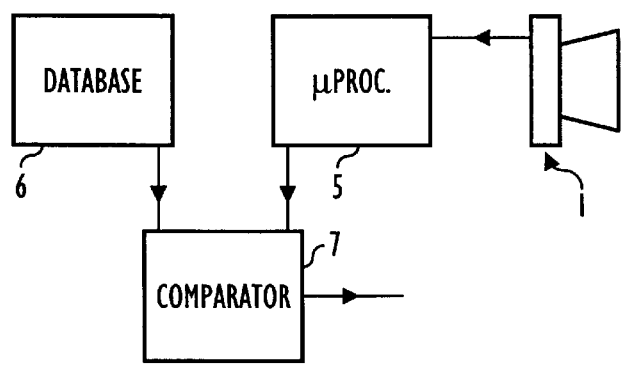
FIG. 2B
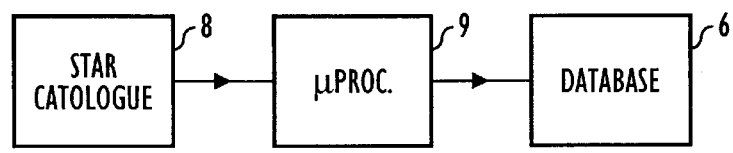

AUTONOMOUS STAR IDENTIFICATION

BACKGROUND OF THE INVENTION

The present invention relates to a method and apparatus for the autonomous identification of stars, which method or apparatus may be employed aboard a spacecraft to determine the position of that spacecraft.

The ability to identify a star, or star pattern, is becoming an increasingly important aspect of spacecraft navigation. The ability to recognize stars autonomously permits three axis orientation of spacecraft attitude to be performed, greatly enhancing the value of star camera data. Spacecraft designed with this inherent autonomy are less reliant on expensive and fragile ground communication links, more robust against system failure, and require fewer sensors. Furthermore, star identification and subsequent navigation enable higher pointing accuracy capabilities to be achieved. Autonomous star identification is of particular benefit to deep space missions where communication delays make interactive decision making inefficient and time-consuming, contributing to a significant portion of the overall mission costs.

Despite these advantages, few star camera systems with an autonomous star identification capability have been developed to date. However, one such system is described in a paper by Roelof W. H. van Bezooijen entitled "True Sky Demonstration Of An Autonomous Tracker" Vol. 2221 "Guidance, control, and tracking," SPIE, Bellingharm, Wash., 1994. The system disclosed in this paper selects pairs of stars in an image frame and determines the angular separation between each pair. This data is compared with data from database recording the angular separation of known star pairs, and a number of candidate matches are identified. This process is repeated for another pair of stars and another set of candidate matches is stored. The space co-ordinates of two sets of candidate matches are then compared and any candidates from the two sets which correspond to the same region of space are identified. A check is then performed by obtaining candidate matches for a further pair of stars within the same region and the previous candidate match confirmed if a candidate match from the third pair also corresponds to the same region of space.

The prior art system described above requires a large storage memory in which to record the angular separation distances for a great number of star pairs. Consequently a finite time is required to identify possible matches and this is sufficient to preclude real time performance.

An alternative technique is disclosed in WO 95/03214 which selects the brightest star within a received image and identifies the two nearest neighbor stars above a predetermined threshold. The three angular separations of the triad of stars are then determined and compared with data stored in a database. With this system the quantity of data to be compared is again such as to preclude real time operation. Furthermore it is difficult to perfectly match camera intensity to the intensity used when generating the database. Even if the threshold intensity could be matched, there is a 55% chance that the nearest neighbor will not correspond to the nearest neighbor of the database (assuming star magnitudes can be determined from the images to an accuracy of ±0.5 magnitudes). This is because the number of stars in a reference catalog grows exponentially with catalog size and therefore many stars always approach the cut off intensity no matter where that cut off intensity level is set. The intensity will vary slightly, due to shifts in spectrum sensitivity of a star camera and other efforts associated with discrete sampling. Because 55% of the stars in the image may not be in the database, different nearest neighbors will be identified in the image relative to those identified when the database was generated.

It is an object of the present invention to provide an improved method and apparatus for identifying a star, which method and apparatus aim to overcome the problems identified with the systems described above.

SUMMARY OF THE INVENTION

According to a first aspect the present invention provides a method of identifying a star comprising:

a) receiving an electronic image of a region of sky;

b) selecting a target star in said image which star is to be identified;

c) selecting at least two other stars, which together with said target star define a group of stars;

d) determining at least two separation values between the stars of said group, and geometrically identifying said star separation values in accordance with a geometric ordering technique;

e) generating a database from known star data, storing in the database for each of a number of known groups of stars data relating to at least two star separation values of that known group and the geometric identity of said star separation values, wherein each known group of stars comprises a known target star and at least two other known stars selected by the same method as step (c), and said geometric identity is derived from a geometric ordering technique in the same manner as the star separation values are geometrically identified in step (d);

f) comparing data relating to said separation values and said geometric identities obtained from said electronic image with corresponding data stored in the database in order to identify said target star in said image.

Unless the target star and at least two other stars are in line, then by employing the above method not only can at least three star separations be determined but each star separation can be geometrically identified relative to the target star. This geometric identification may be accomplished by listing the separation values in a particular order, which order is the same as used to generate the database, for example where a target star and two other stars are identified forming a triad, the star separation, corresponding to sides of a triangle, can be geometrically identified by their position in that triangle relative to the target star, as described in more detail below with reference to the specific embodiment illustrated in the drawings. This technique enables each piece of data corresponding to a star separation to be uniquely identified without needing to rely on star magnitudes or separation feature distributions, identifications will be possible even if the star group is misordered by magnitude.

Preferably said at least two other stars are selected from an annulus centered on said target star, and when generating the database, said at least two other known stars associated with each known target star are selected from an annulus centered on that known target star, which annulus has the same dimensions as the annulus centered on the target star of the received image.

Because annuli are radially symmetric the annulus will contain the same stars regardless of the orientation of the image. Furthermore restricting minimum separations (governed by the inner radii of the annulus) allows easier location of star centroids and removes problems caused by binary of double stars (whether they appear as separate bodies or as one conglomerate in the image). Restricting maximum separations (governed by the outer radii of the annulus) accounts for the restricted field of view of the camera which generated said image.

Preferably the method comprises categorizing as a target star each star within a predetermined area of said received image which has an intensity above a predetermined threshold; identifying each target star, and rejecting any identification which is not feasible relative to the majority of target star identifications. The predetermined area of the image selected will normally be central and leave a margin around the edge of the image to ensure that an annulus positioned around any target star within the predetermined area does not substantially extend outside of the image. Some annuli may extend a little beyond the image for and it has been found that if 10% of the area of the annulus extends outside the image this does not significantly alter the performance of the star identification technique. Also, because the method is performed on all the brightest stars in the predetermined area of the image, this alleviates the problems of recognizing dimmer stars that may or may not be in the database. Employing this method produce well distributed separation features and minimizes reliance on star magnitudes.

Advantageously two other stars are selected which together with the target star from a triad, the method comprising determining all three star separation values of said triad. Once all three star separation values are geometrically identified, a non-serial binary tree technique can be employed to identification corresponding known target star within the database.

The method of identifying two other stars in an annulus centered on said target star is particularly advantageous in its own right, and may advantageously be employed with systems which do not require a geometric identification technique. Therefore according to a second aspect of the invention there is provided a method of identifying a star comprising:

a) receiving an electronic image of a region of sky;
b) selecting a target star in said image which star is to be identified;
c) selecting at least two other stars in said image from an annulus centered on said target star, the target star and at least two other stars defining a group of stars;
d) determining at least two separation values between the stars of said group;
e) generating a database from known star data, storing in said database for each of a number of known target stars data relating to at least two star separation values between a group of stars comprising said known target star and at least two other known stars which at least two other known stars are selected from an annulus centered on the known target star which annulus has the same dimensions as the annulus of step (c).

According to third and fourth aspects of the present invention there is provided apparatus for implementing methods in accordance with the first and second aspects of the invention respectively.

One embodiment of the present invention will now be described by way of example only with reference to the accompanying drawings in which like numerals are used throughout to indicate features common to more than one figure.

BRIEF DESCRIPTION OF THE DRAWINGS

FIG. 1 illustrates components of a star camera;

FIG. 2A and 2B illustrate an apparatus in accordance with the present invention;

DETAILED DESCRIPTION OF THE INVENTION

Figure 3:
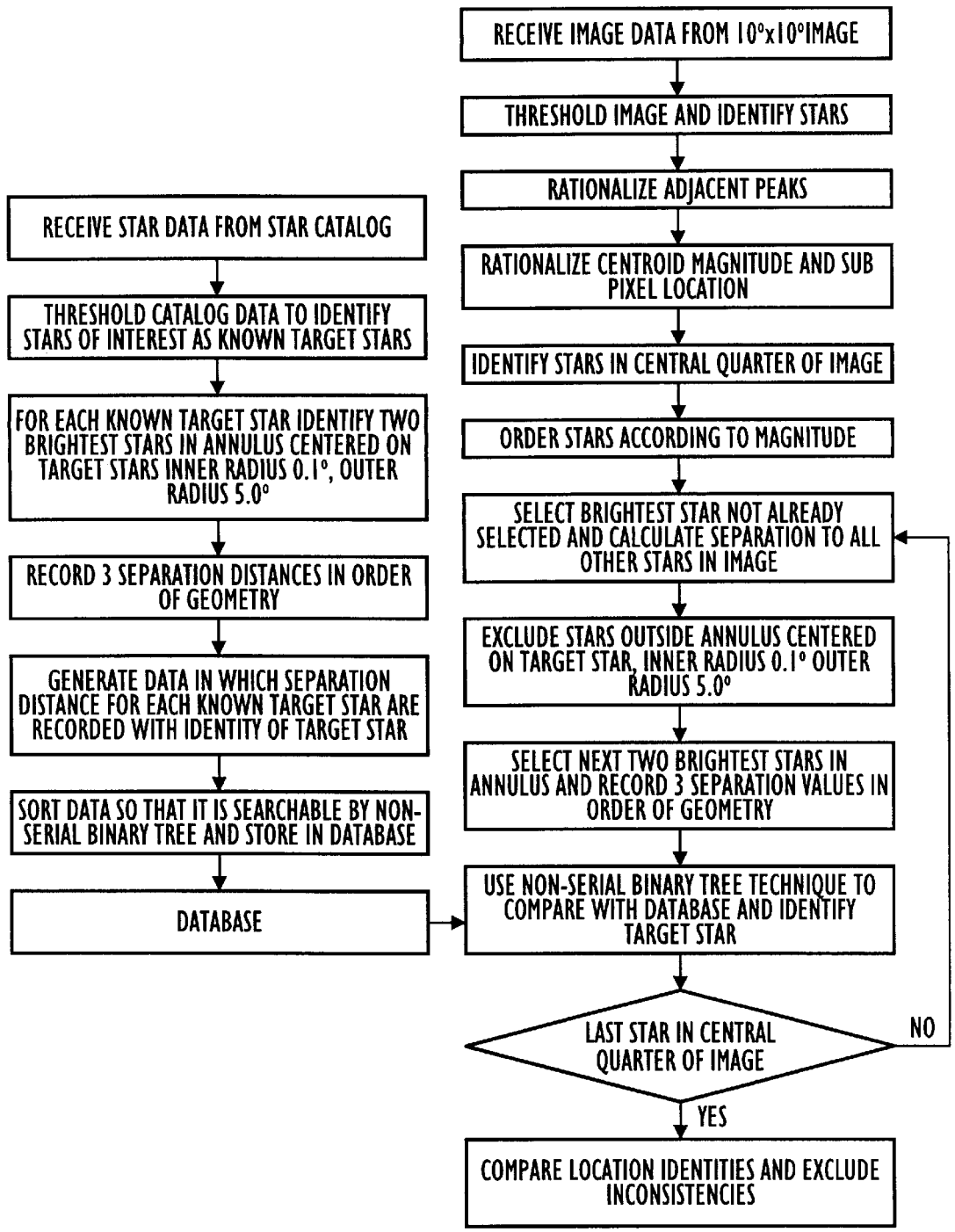
FIG. 3 is a flow diagram of a method in accordance with the first and second aspects of the present invention.

Referring to FIG. 1 there is illustrated a star camera 1 comprising an optical arrangement and a charge coupled device (CCD) 3. The optical arrangement 2 and CCD 3 are arranged such that a 10° by 10° image is obtained on the CCD image plane, the position on the CCD image plane being subsequently determined in terms of co-ordinates U and V as illustrated. Light from a distant star 4 generates an image 4A on the CCD 3 and the CCD 3 captures the image as a discrete grid of pixels of varying intensities to be subsequently processed The CCD is cooled by any convenient cooling device to −20° C. to improve image quality by reducing thermal noise. This type of technique is conventional in standard star cameras.

A 10° by 10° image field would normally be adequate to ensure sufficient stars are identifiable for recognition. However it will be appreciated that this is dependent on the sensitivity of the CCD, the type of optics employed, and the data available on a standard star reference catalog as, discussed below.

In FIG. 2A the star camera 1 is illustrated connected to microprocessor 5, which processes the image in accordance with the method described below with reference to FIG. 3. Data from the processed image is compared with data stored in database 6 by comparator 7 in order to identify the star in the received image. In practice the microprocessor 5, database 6 and comparator 7 will all be one unit suitable for mounting onboard a spacecraft and indeed may be housed within the housing of the star camera 1.

The database 6 of FIG. 2A is generated from a star catalog. This is illustrated in FIG. 2B. Varius star catalogs are available in electronic form, such as the Hipparcos input catalog of 118,000 stars covering the entire sky. Star catalog 8 is processed by microprocessor 9 to generate database 6 as described below with reference to FIG. 3.

The apparatus illustrated in 2B could be incorporated into that of FIG. 2A. However the autonomous star identification apparatus of FIG. 2A will normally be employed aboard a spacecraft where: real time processing is required; space and weight requirements are at a premium; it is desirable to minimize the processing requirements both to reduce the space requirements and also to reduce the risk of malfunction. For these reason, the apparatus of FIG. 2B is used (as described below) to compile a database in a suitable format for comparison with the data from the image processed aboard a spacecraft.

Referring to FIG. 3 a method in accordance with the present invention is illustrated. FIG. 3 is set out in two columns, the left hand column comprising those steps necessary to produce the database, which steps would normally be performed at a ground base station. The right hand column illustrates those steps that would typically be performed aboard a spacecraft, the database generated by the method in the left hand column being downloaded to the spacecraft.

Referring to the left hand column of FIG. 3, data is received from a star catalog such as the Hipparcos input catalog. The data is truncated to stars having a brightness greater than +7.4, and the position of the stars is corrected for the year in which the database generated will he employed. This process identifies a number of stars which can all be defined as known target stars. Alternatively certain ones can be selected to provide a fairly even coverage of the whole sky. A rapid search technique is employed to identify the two brightest known stars in the catalog which he in an annulus centred on each known target star respectively. The annulus has an inner radius of 0.1° and an outer radius of 5.0°.

Figure 4A:
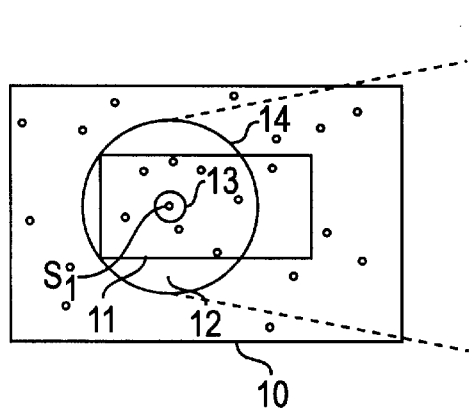
FIGS. 4A and 4B are illustrative of the method of FIG. 3.

For each known target star the associated two brightest stars are determined, and the three stars form a triad. The three separation values of each triad are determined, and the geometry of the separation values is also identified The geometry may be identified by any convenient method. For example, provided the three stars do not lie on a straight line (in which case that particular triad will have to be ignored), the triad of stars will form a triangle S1, S2, S3, as illustrated in FIG. 4A and shown in enlarged insert 4B. This triangle, relative to the known target star, has an anti-clockwise edge (S1-S2), a clockwise edge (S1-S3), and an opposite edge (S2-S3).

In a practical microprocessor implementation, group geometry (which side of the triad is the clockwise side) may be evaluated using the following method. The three star locations A, B and C (in U, V co-ordinates shown in FIG. 1) in the image may be described by Cartesian position vectors on a unit sphere centred on the intersection between the optical plane and the camera boresight. This transformation of star U and V co-ordinates to Cartesian position vectors requires approximate knowledge of the focal length of the camera system and is commonly described in references such as "Spacecraft Attitude Determination and Control" by J. Wertz, Kluwer Academic Publishers, 1991, page 256. Catalog stars may also be described as Cartesian position vectors on a unit sphere with the conversion from other co-ordinates also described in the Wertz retevence.

The three unit vectors corresponding to three stars may be labelled a, b and c as shown in FIG. 1, where the bold characters are vectors. If a vector corresponds to the target star S1, the star label corresponding to vector b and the star label corresponding to vector c may be determined by defining the sign of the triple scalar product between a, and b and c (a, b x c), which is a quantity equivalent to the volume of a parallel pipe spanned by three vectors a, b and c. The sign of this scalar quantity describes the group geometry of the three stars. Requiring that the sign of this scalar quantity follows a particular fixed convention, star label S2 may be associated with location b if the scalar quantity is one sign and location c if the scalar quantity is the other sign. Finally, star label S3 is associated with the remaining vector location. If a consistent convention is used to order the stars in catalog triads and image triads, the stars and then the star separations may also be geometrically ordered and recorded in a repeatable sequence such as S1-S2 first, S1-S3 second and S2-S3 last.

The separation values corresponding to these three sides can be geometrically identified by simply being recorded in a particular order such as: S1-S2 first; S1-S3 second; and S2-S3 last. Data relating to these star separation values, geometrically identified and respectively associated with a known target star, is then sorted so that it is searchable by a non-serial binary tree technique and stored in database 6, which may typically contain data relating to 17,000 triads Once the database has been generated, image data is received from an image generated by the star camera 1 of FIGS. 1 and 2A and processed by the microprocessor 5. In accordance with the method as set out in the right hand column of FIG. 3, the received data from a 10° by 10° image 10 of FIG. 4A is threshold to reveal a number of stars having a magnitude above a predetermined threshold intensity. Standard processing techniques are employed to rationalize adjacent peaks in the image, in order to identify adjacent peaks generated by radiation from one star falling on two adjacent pixels. Microprocessor 5 determines the central magnitude of such peaks and the associated sub-pixel location.

Stars are identified that have coordinates corresponding to a central region 11 (FIG. 4A) of the image, which region typically extends over one quarter of the image. Stars in this central region 11 are ordered according to their magnitude and defined as target stats to be identified. For the brightest target star, the separation to all the other stars in the image 10 is calculated, and with stars having separation distances from the target stars corresponding to positions outside of annulus 12, are excluded. Inner edge 13 of annulus 12 has a radius of 0.1°, and outer edge 14 has a radius of 50°. Both the inner and outer edges are centered target star S1 as illustrated in FIGS. 4A and 4B.

Figure 4B:
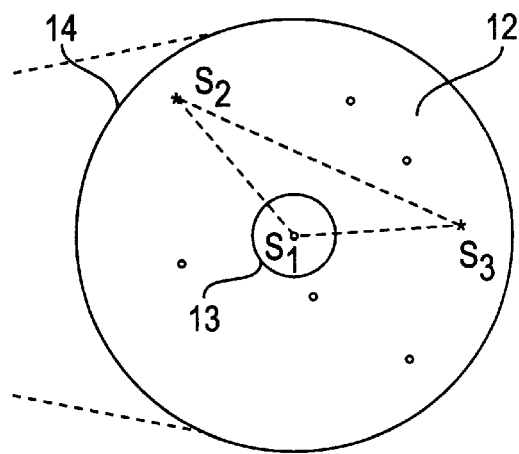

The brightest stars, S2 and S3, within annulus 12 are determined, as illustrated in FIG. 4B. The separation values S1-S2, S1-S3 and S2-S3 are recorded and identified by the order in which they are recorded.

It should be noted that the data in the database 6 of FIG. 2 and the data received from the image has been processed in the same manner. In particular, the data has been selected from the same annulus and ordered by the same geometric technique.

The data relating to the separation values determined for each triad associated with a particular target star detected in the received image could be compared with corresponding data in the database in order to identify that target star. However as the database may typically contain data relating to some 17,000 triads, this data must be organized so that triads extracted from the star camera images may be rapidly compared to the complete set of possibilities in the database to find a match, especially if real time performance is required.

With data on such a large number of triads contained within the database, a serial comparison is not practicable in a real time application, and would require thousands of comparisons to resolve a match. However, by using data relating to separation values which must lie in a predetermined range defined by the annulus 12, and by having each target star being associated with 3 separation values, which are geometrically identified, well defined bounded measurement areas are available which enables a comparison process to be easily adapted to parallelization. One particularly applicable technique is disclosed in a paper entitled "A fast autonomous star acquisition algorithm for spacecraft" by B. M Quine and H. F Durrant-Whyte, Control Eng Practice, Vol. 4, No.12, pp 1735–1740, 1996, which is herein incorporated by way of reference.

The teaching of the above recited paper is outside the scope of the present specification, but in summary the technique employs a divide and conquer approach, whereby a separation value is chosen that sequentially splits the set of all possible identification candidates into two sets (greater than or less than the split values). Each subset is then split and split again using separate difference separation features (S1-S2, S1-S3 or S2-S3) and split values until only one star entry is left. Split values and the features they relate to form a tree of split questions that may be used to identify the image feature set.

By ensuing, that the tree has a rigid structure (for example by requiring that the split question always exactly divides the remaining identification candidates evenly, rounding down in the case of an odd set,) the reordering of the catalog may be carried out in advance allowing stars to be identified quickly and efficiently by proceeding down to the roots of the tree asking the relevant split questions. Therefore it is preferable that the database is pre-ordered for searching by such a binary search tree.

As indicated in FIG. 3 the search is repeated for each potential star in the central quarter of the image, and by searching for the brightest target stars, this maximizes the chance of the database containing a corresponding entry. However, because a number of stars above a predetermined threshold level are determined to be target stars, the exact ordering of the brightness of the stars is not critical. Once an identity has been established for each of the target stars within the central quarter of the received image, the location of these identities is compared, and any inconsistencies are excluded. The identity of target stars, once known, can be used to determine the position of a spacecraft from which the image was taken.

One embodiment of the present invention has been described above by way of example only. However various embodiments of the present invention will occur to a person skilled in this art which embodiments will be within the scope of the appended claims.

What I claim is:

1. A method of identifying a star comprising the steps of:
    a) receiving an electronic image of a region of sky;
    b) selecting a target star in said image which star is to be identified;
    c) selecting at least two other stars, which together with said target star define a group of stars;
    d) determining at least two separation values between the stars of said group, and geometrically identifying each said star separation value relative to at least one other star separation value in accordance with a geometric ordering technique;
    e) generating a database from known star data, storing in the database for each of a number of known groups of stars data relating to at least two star separation values of that known group and the geometric identity of each said star separation value relative to at least one other star separation value, wherein each known group of stars comprises a known target star and at least two other known stars selected by the same method as step (c), and said geometric identity is derived from a geometric ordering technique in the same manner as the star separation values are geometrically identified in step (d);
    f) comparing data relating to said separation values and said geometric identities obtained from said electronic image with corresponding data stored in the database in order to identify said target star in said image.

2. A method as claimed in claim 1 comprising in step (c) selecting said at least the two other stars from an annulus centered on said target star.

3. A method as claimed in claim 2, wherein when generating the databases, said at least two other known stars associated with each known target star are selected from an annulus centered on that known target star, which annulus has the same dimensions as the annulus of claim 2.

4. A method as claimed in claim 1 comprising: categorizing as a target star each star within a predetermined area of said received image having an intensity above a predetermined threshold; identifying each target star; and rejecting any identification which is not feasible relative to the majority of target star identifications.

5. A method as claimed in claim 1 comprising selecting two other stars which together with said target star form a triad, the method comprising determining all three star separation values of said triad.

6. A method as claimed in claim 1 comprising comparing, by using a non-serial binary tree technique, data relating to said separation values obtained from said electronic image with data stored in said database.

7. A method as claimed in claim 5 comprising selecting the two brightest stars in the annulus to be said two other stars.

8. A method as claimed in claim 5 comprising selecting said two other stars from an annulus centered on said target star, and when generating said database, selecting as said at least two other known stars, the two brightest known stars in a corresponding annulus centered on each respective known target star.

9. A method as claimed in claim 8 comprising categorizing as a target star each star within a predetermined area of said received image having an intensity above a predetermined threshold and subsequently identifying each target star, the method further comprising rejecting any identification which is not feasible relative to the majority of target star identifications.

10. A method as claimed in claim 9 comprising comparing, by using a non-serial binary tree technique, the data relating to said separation values obtained from said electronic image with the data stored in said database.

11. A method of identifying a star comprising the steps of:
    a) receiving an electronic image of a region of sky;
    b) selecting a target star in said image which star is to be identified;
    c) selecting at least two other stars in said image from an annulus centered on said target star, the target star and at least two other stars defining a group of stars;
    d) determining at least two separation values between the stars of said group;
    e) generating a database from known star data, storing in said database for each of a number of known target stars data relating to at least two star separation values between a group of stars comprising said known target star and at least two other known stars, which at least two other known stars are selected from an annulus centered on the known target star which annulus has the same dimensions as the annulus of step (c);
    f) comparing data relating to said star separation values obtained from said electronic image with corresponding data stored in the database in order to identify said target star in said image.

12. A method as claimed in claim 11 comprising categorizing as a target star each star within a predetermined area of said image having an intensity above a predetermined threshold and identifying each target star, the method further comprising rejecting any identification which is not feasible relative to the majority of target star identifications.

13. A method as claimed in claim 11 comprising selecting two other stars which together with the target star form a triad, the method comprising determining all three star separation values of said triad.

14. A method as claimed in claim 11 comprising comparing by using a non-serial binary tree technique data relating to the separation values obtained from said electronic image with data stored in said database.

15. Star identification apparatus comprising:

an input for receiving an electronic image of a region of sky;

processing means for processing said image, identifying a relatively bright star of said image and categorizing that star as a target start, said processing means identifying at least two other stars having an intensity above a predetermined threshold;

calculating means for determining at least two separation values between a group of stars consisting of said target star and said at least two other stars identified by said processing means;

geometric identifying means for assigning geometric identities to each said separation value relative to at least one other said separation value in accordance with a geometric ordering technique;

a database containing data derived from known star data, said data including for each of a number of known groups of stars data relating to at least two known star separation values, each known group of stars comprising a known target star and at least two other known stars identified in the same manner as said two other stars are identified by said processing means, said at least two known star separation values being geometrically identified in said database in the same manner as said two other stars are identified by said geometric identifying means; and comparison means arranged to compare data obtained from said electronic image with data stored in said database in order to identify said target star in said image.

16. Apparatus as claimed in claim 15 wherein said processing means is arranged to identify said at least two other stars in an annulus centered on said target star.

17. Apparatus as claimed in claim 16 wherein the at least two other known stars of each group of known stars are located in an annulus centered on the known target star which annulus has the same dimensions as the annulus of claim 16.

18. Apparatus as claimed in claim 15 wherein said processing means is arranged to categorize as a target star each star having an intensity above a predetermined threshold within a predetermined area of said received image and wherein the apparatus subsequently identifies each target star, the apparatus further comprising rejection means for rejecting any identification which is not feasible relative to the majority of target star identifications.

19. Apparatus as claimed in claim 15 wherein said processing means selects two other stars with together with said target star form a triad, said calculating means determining all three star separation values of said triad.

20. Apparatus as claimed in claim 15 wherein said comparison means employs a non-serial binary tree technique to compare data relating to said separation values obtained from said electronic image with data stored in said database.

21. Apparatus as claimed in claim 19 wherein said processing means is arranged to select the two brightest stars in the annulus to be said two other stars.

22. Apparatus as claimed in claim 19 wherein said processing means selects said two other stars from an annulus centered on said target star, and wherein said database contains data relating to star separation values determined by selecting as said two other known stars, the two brightest known stars in a corresponding annulus centered on each respective known target star.

23. Apparatus as claimed in claim 22 wherein said processing means categorizes as a target star each star within a predetermined area of said received image having an intensity above a predetermined threshold, said apparatus subsequently identifying each target star, the apparatus further comprising rejection means for rejecting any identification which is not feasible relative to the majority of target star identifications.

24. Apparatus as claimed in claim 23 wherein said comparison means employs a non-serial binary tree technique, to compare data relating to said separation values obtained from said electronic image with data stored in said database.

25. Star identification apparatus comprising:

a) an input for receiving an electronic image of a region of sky;

b) processing means for processing said image and identifying a relatively bright star of said image and categorizing that star as a target star to be identified, said processing means being arranged to select at least two other stars in said image from an annulus centered on said target star, said target star and said at least two other stars defining a group of stars;

c) calculating means for determining at least two separation values between the stars of said group;

d) a database generated from known star data, in which is stored for each of a number of known target stars data relating to at least two star separation values between a group of stars comprising said known target star and at least two other known stars, which at least two other known stars are selected from an annulus centered on the known target star which annulus has the same dimensions as the annulus used by said processing means;

e) a comparator for comparing the two separation values obtained by the calculating means with corresponding data in the database and identifying said target star from said comparison.

26. Apparatus as claimed in claim 25 wherein said processing means categorizes as a target star each star within a predetermined area of said image having an intensity above a predetermined threshold, said apparatus subsequently identifying each target star, the apparatus further comprising rejection means for rejecting any identification which is not feasible relative to a majority of target star identifications.

27. Apparatus as claimed in claim 25 wherein said processing means selects two other stars which together with said target star form a triad, said calculating means determining all three star separation values of said triad.

28. Apparatus as claimed in claim 25 wherein said comparison means employ a non-serial binary tree technique to compare data relating to the separation values obtained from said electronic image with data stored in said database.

* * * * *